United States Patent [19]
Gurney et al.

[11] Patent Number: 5,856,617
[45] Date of Patent: Jan. 5, 1999

[54] ATOMIC FORCE MICROSCOPE SYSTEM WITH CANTILEVER HAVING UNBIASED SPIN VALVE MAGNETORESISTIVE STRAIN GAUGE

[75] Inventors: Bruce Alvin Gurney, Santa Clara; Harry Jonathon Mamin, Palo Alto; Daniel Rugar, Los Altos; Virgil Simon Speriosu, San Jose, all of Calif.

[73] Assignee: International Business Machines Corporation, Armonk, N.Y.

[21] Appl. No.: 922,210

[22] Filed: Sep. 2, 1997

[51] Int. Cl.⁶ .............................. G01B 7/24; G01B 7/34; G01R 33/02
[52] U.S. Cl. .............................................. 73/105; 324/252
[58] Field of Search ...................... 73/105, 777; 250/306; 324/252; 360/113

[56] References Cited

U.S. PATENT DOCUMENTS

| | | |
|---|---|---|
| 4,884,453 | 12/1989 | Hoffmann et al. . |
| 5,168,760 | 12/1992 | Wun-Fogle et al. . |
| 5,206,590 | 4/1993 | Dieny et al. ............................ 324/252 |
| 5,266,801 | 11/1993 | Elings et al. ............................ 250/306 |
| 5,287,238 | 2/1994 | Baumgart et al. ................... 324/252 X |
| 5,345,816 | 9/1994 | Clabes et al. ............................ 73/105 |
| 5,627,703 | 5/1997 | Smith ...................................... 360/113 |
| 5,747,997 | 5/1998 | Dahlberg et al. ....................... 324/252 |
| 5,764,056 | 6/1998 | Mao et al. .............................. 324/252 |

OTHER PUBLICATIONS

S. F. Cheng et al., "Magnetostrictive Effects in Cu/Co/Cu/Fe Spin Valve Structures", Journal of Magnetism and Magnetic Materials, vol. 148, 1995, pp. 344–345.

R. C. O'Handley et al., "New Spin–Valve Magnetic Field Sensors Combined with Strain Sensing and Strain Compensation", IEEE Transactions on Magnetics, vol. 31, No. 4, Jul. 1995, pp. 2450–2454.

*Primary Examiner*—Daniel S. Larkin
*Attorney, Agent, or Firm*—Thomas R. Berthold

[57] ABSTRACT

An atomic force microscope (AFM) uses a spin valve magnetoresistive strain gauge formed on the AFM cantilever to detect deflection of the cantilever. The spin valve strain gauge operates in the absence of an applied magnetic field. The spin valve strain gauge is formed on the AFM cantilever as a plurality of films, one of which is a free ferromagnetic layer that has nonzero magnetostriction and whose magnetic moment is free to rotate in the presence of an applied magnetic field. In the presence of an applied stress to the free ferromagnetic layer due to deflection of the cantilever, an angular displacement of the magnetic moment of the free ferromagnetic layer occurs, which results in a change in the electrical resistance of the spin valve strain gauge. Electrical resistance detection circuitry coupled to the spin valve strain gauge is used to determine cantilever deflection.

11 Claims, 15 Drawing Sheets

ATOMIC FORCE MICROSCOPE SYSTEM WITH CANTILEVER HAVING UNBIASED SPIN VALVE MAGNETORESISTIVE STRAIN GAUGE

TECHNICAL FIELD

This invention relates to atomic force microscope (AFM) systems that employ a microfabricated cantilever having a stylus or tip at its free end for scanning the surface of a sample, and more particularly to an AFM system that uses a new technique for detecting cantilever deflection.

BACKGROUND OF THE INVENTION

Atomic force microscopy is based upon the principle of sensing the forces between a sharp stylus or tip and the surface to be investigated. The interatomic forces induce the displacement of the tip mounted on the free end of a cantilever.

As described by Binnig et al., "Atomic Force Microscope", *Phys. Rev. Lett.*, Vol. 56, No. 9, Mar. 3, 1986, pp. 930–933, a sharply-pointed tip is attached to the free end of a flexible spring-like cantilever to scan the profile of a surface to be investigated. The attractive or repulsive forces occurring between the atoms at the apex of the tip and those of the surface result in tiny deflections of the cantilever. In its original implementation, a tunneling junction was used to detect the motion of the tip attached to an electrically-conductive cantilever. An electrically-conductive tunnel tip is disposed within the tunnel distance from the back of the cantilever, and the variations of the tunneling current are indicative of the cantilever deflection. The forces occurring between the tip and the surface under investigation are determined from the measured cantilever deflection and the characteristics of the cantilever.

The principle of atomic force microscopy has been extended to the measurement of magnetic, electrostatic, and frictional forces, with the tip operating in either contact or near-contact with the surface of the sample. Magnetic force microscopy using a magnetized iron tip is described by Martin et al., "High-resolution Magnetic Imaging of Domains in TbFe by Force Microscopy", *Appl. Phys. Lett.*, Vol. 52, No. 3, Jan. 18, 1988, pp. 244–246. Electrostatic force microscopy is described by Terris et al., "Localized Charge Force Microscopy", *J. Vac. Sci. Technol. A*, Vol. 8, No. 1, January/February 1990, pp. 374–377. Frictional force microscopy is described in Meyer et al., "Simultaneous Measurement of Lateral and Normal Forces with an Optical-Beam-Deflection Atomic Force Microscope", *Appl. Phys. Lett.*, Vol. 57, No. 20, Nov. 12,1990, pp. 2089–2091. As in atomic force microscopy as originally conceived by Binnig et al., the forces in all of these techniques are determined from the measured cantilever deflection and the characteristics of the cantilever. It can be argued that whereas magnetic, van der Waals, electrostatic, and frictional forces differ in magnitude and range of interaction, they are all ultimately atomic in nature. Accordingly, the term "atomic force microscope" as used herein includes any scheme in which a tip attached to a cantilever is moved with respect to a surface, and the deflection of the cantilever is used to ascertain the force exerted on the tip by the sample, regardless of the range or origin of the interaction between the tip and the sample.

AFM systems have applications beyond their original application of imaging the surface of a sample. For example, AFM systems have been proposed for data storage, as described in IBM's U.S. Pat. No. 5,537,372. In that application, the tip on the cantilever free end is in physical contact with the surface of a data storage medium. The medium has surface incongruences in the form of bumps and/or depressions that represent data. The deflection of the cantilever is detected and decoded to read the data. Data can also be written on the medium, if the medium has a heat-deformable surface, by heating the cantilever tip when it is in contact with the medium surface to form bumps or depressions on the medium surface.

In addition to tunneling current detection, several other methods of detecting the deflection of the AFM cantilever are available. Optical beam deflection is currently the most common form of detection used in commercial instruments but does not provide an integrated, purely electrical signal readout. Other methods include optical interferometry, capacitive techniques, and more recently piezoresistance.

The principle of piezoresistance to detect the deflection of the AFM cantilever is described in U.S. Pat. No. 5,345,815. The cantilever is formed of single-crystal silicon which is implanted with a dopant to provide a piezoresistive region along the length of the cantilever. Deflection of the free end of the cantilever produces stress in the cantilever. That stress changes the electrical resistance of the piezoresistive region in proportion to the cantilever's deflection. A resistance measuring apparatus is coupled to the piezoresistive region to measure its resistance and to generate a signal corresponding to the cantilever's deflection. Moving the cantilever tip across a sample for scanning is relatively straightforward with piezoresistive detection in comparison to optical detection, for which external optics must move with the cantilever. However, piezoresistive cantilevers do not have the same sensitivity as optical schemes, and also suffer from low frequency noise and temperature drift inherent in all semiconductor strain gauges. Also, they require that the cantilevers be formed of single-crystal silicon.

IBM's U.S. Pat. No. 5,345,816 describes an AFM system with strain sensors mounted on a needle-like probe on the cantilever free end to detect lateral or in-plane variations in the sample being scanned. U.S. Pat. No. 5,266,801 mentions but does not describe an embodiment of an AFM system with a strain gauge located on the cantilever for sensing deflection of the cantilever.

Giant magnetoresistance (GMR) has been observed in a variety of magnetic multilayered structures wherein the application of an external magnetic field causes a variation in the relative orientation of neighboring ferromagnetic layers. This in turn causes a change in the spin-dependent scattering of conduction electrons and thus the electrical resistance of the structure. The resistance of the structure thus changes as the relative alignment of the magnetizations of the ferromagnetic layers changes. The use of a GMR multilayered structure in the presence of an applied magnetic bias field as a strain gauge for replacement of conventional semiconductor strain gauges is described in U.S. Pat. No. 5,168,760.

A particularly useful application of GMR is a sandwich structure comprising two substantially uncoupled ferromagnetic layers separated by a nonmagnetic metallic layer in which the magnetic moment of one of the ferromagnetic layers is pinned. The pinning may be achieved by depositing the layer onto an antiferromagnetic layer to exchange couple the two layers. This results in a spin valve magnetoresistive structure in which the magnetic moment of only the unpinned or free ferromagnetic layer is free to rotate in the presence of an external magnetic field. IBM's U.S. Pat. No. 5,206,590 discloses a basic spin valve magnetoresistive sensor.

It is desirable to increase the sensitivity of the cantilever detection technique in AFM systems so that smaller amounts of cantilever movement can be reliably detected.

SUMMARY OF THE INVENTION

The invention is an atomic force microscope (AFM) that uses a spin valve magnetoresistive strain gauge that operates in the absence of an applied magnetic field to detect deflection of the AFM cantilever. The spin valve strain gauge is formed on the AFM cantilever as a plurality of films, one of which is a free ferromagnetic layer that has nonzero magnetostriction and whose magnetic moment is free to rotate in the presence of an applied magnetic field. In the presence of an applied stress to the free ferromagnetic layer due to deflection of the cantilever, an angular displacement of the magnetic moment of the free ferromagnetic layer occurs, which results in a change in the electrical resistance of the spin valve strain gauge. Electrical resistance detection circuitry coupled to the spin valve strain gauge on the cantilever is used to determine cantilever deflection.

For a fuller understanding of the nature and advantages of the present invention, reference should be made to the following detailed description taken together with the accompanying figures.

DESCRIPTION OF THE PREFERRED EMBODIMENTS

Spin valve magnetoresistive sensors are fabricated to exhibit low, preferably zero, magnetostriction. Magnetostriction (in actuality "saturation magnetostriction") is the fractional change in length, $\Delta L/L$, of the ferromagnetic films when the sensor is magnetized to saturation from its unmagnetized state, where "L" is the length of the films in the direction of the applied magnetic field and "$\Delta L$" is the change in length of the films. The magnetostriction must be close to zero in the ferromagnetic films of the sensor because of uncontrollable stresses induced in the sensor during fabrication, and lapping of the wafer on which the head is formed. These stresses result in strain in the ferromagnetic films that would alter the magnetic properties of the films. In particular, magnetic anisotropies can thereby be induced in the films. Since the ferromagnetic films in the sensor layer are magnetically soft so that the free ferromagnetic film is sensitive to small magnetic fields, any induced magnetic anisotropies can seriously alter the performance of the sensor.

In the present invention, in contrast to spin valve mangetoresistive sensors, spin valve magnetoresistive structures are deliberately made to be magnetostrictive so that the free layer effective anisotropy is changed, and the angular orientation of the magnetic moment of the free layer relative to the magnetic moment of the pinned layer is thereby changed in the presence of strain due to stress. Subsequent stress on the substrate on which the spin valve structure is formed induces changes in the angular displacement of the magnetic moment of the free layer, which in turn changes the resistance. Because the change in resistance can be quite large, of the order of 5–10% or more, the inherent sensitivity can also be large.

Figure 1A:
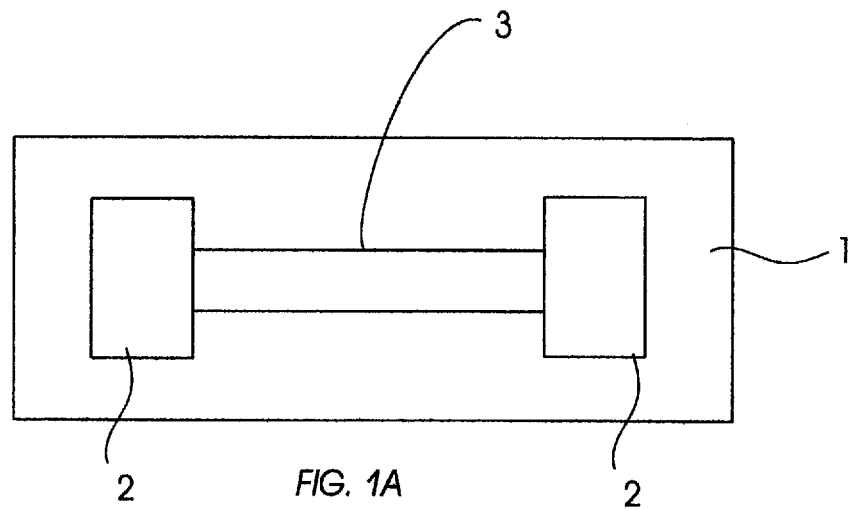
FIG. 1A is a top plan view of a spin valve strain gauge according to the present invention.
Figure 1B:
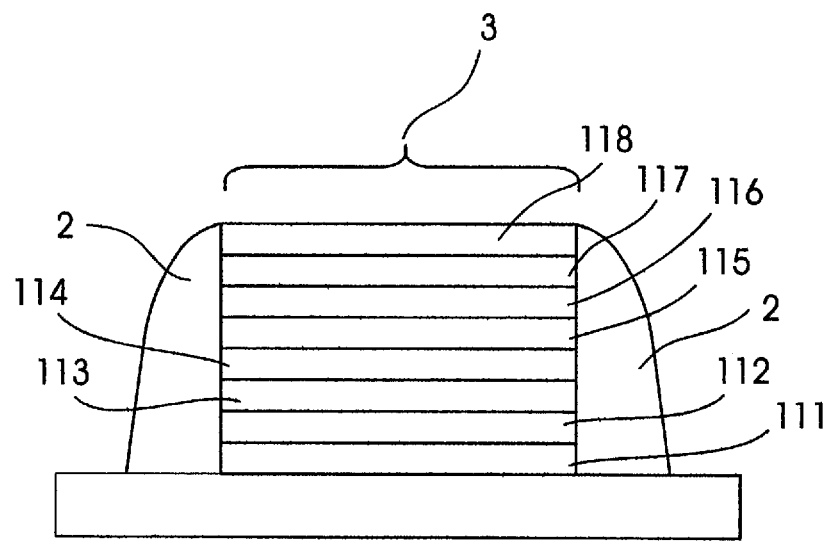
FIG. 1B is a side sectional view of the spin valve strain gauge of FIG. 1A illustrating the individual layers.

FIGS. 1A–1B illustrate top and side views, respectively, of a strain gauge according to the present invention. It includes a substrate 1, a pair of electrical contacts 2, and a spin valve structure 3 comprising films 111–118. The contacts 2 can be separately deposited contact pads, such as sputtered gold films, or regions of the spin valve structure which are reserved for the attachment of electrical leads. In the particular embodiment shown in FIGS. 1A–1B, the spin valve strain gauge is deposited onto the substrate 1 directly through sputtering, but evaporation or other film deposition techniques will also work.

Film 111 on substrate 1 is a 50 Å Ta seed layer. Films 112–114 are a trilayer structure which comprise the free ferromagnetic layer. First, 5 Å of NiFe is deposited (112), then 75 Å of Ni (113), and 10 Å of Co (114). The use of Co at the interface with the nonmagneic spacer layer in a spin valve magnetoresistive structure is described in IBM's U.S. Pat. No. 5,341,261. Film 115 is 35 Å of Cu, the nonferromagnetic metallic spacer layer. Film 116 is 35 Å of Co, the pinned ferromagnetic layer, followed by 150 Å of FeMn (117) as the antiferromagnetic layer for pinning film 116 by interfacial exchange coupling, and 50 Å of Ta (118) as the protective capping layer.

Figure 2A:
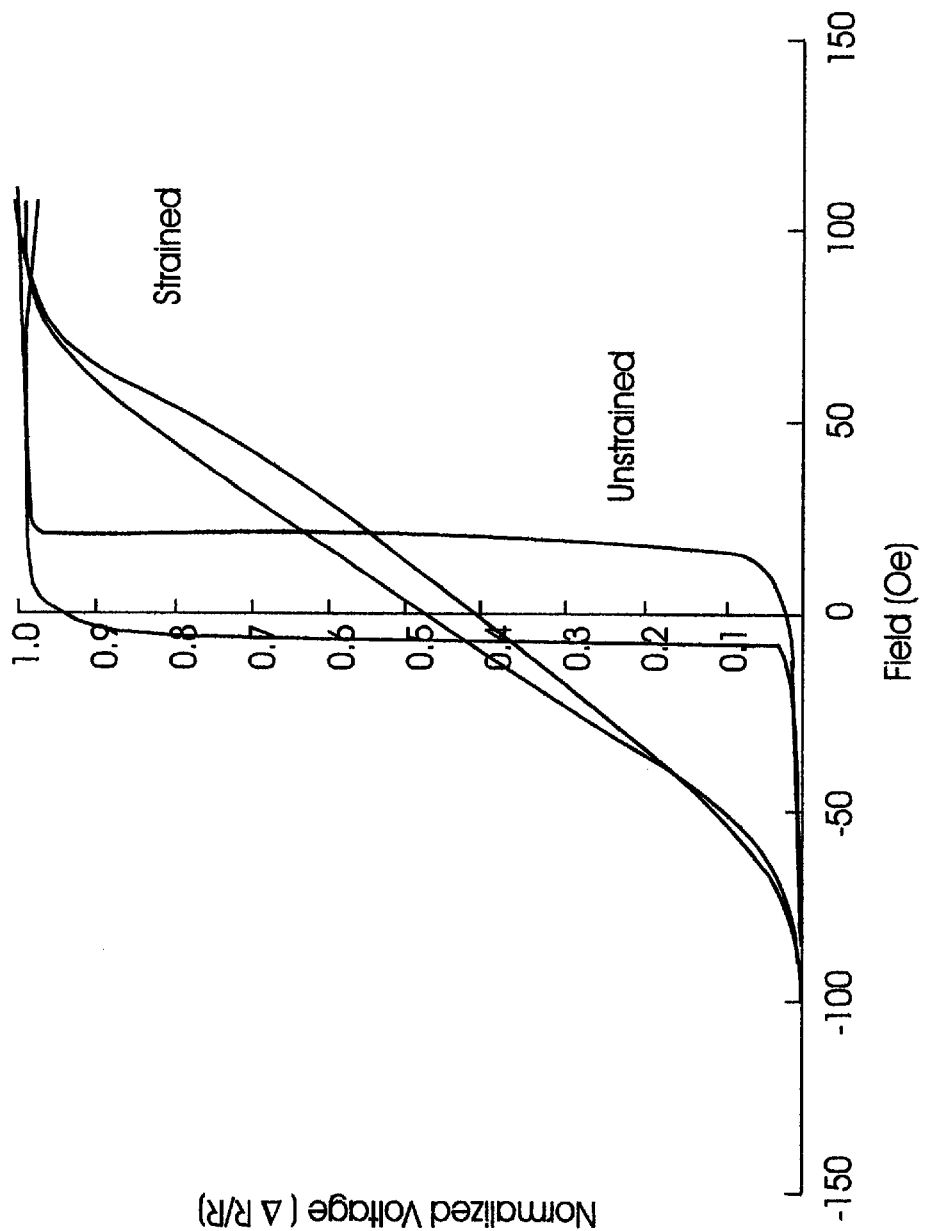
FIG. 2A is a curve of measured magnetoresistance as a function of applied magnetic field for the unstressed and stressed spin valve strain gauge.

FIG. 2A shows the dependence of the magnetoresistance ($\Delta R/R$) on the applied magnetic field for the structure of FIGS. 1A–1B. For FIGS. 2A–2M, consider the left-most (descending) portion of the hysteresis loop. In FIG. 2A, for the unstrained film, the curve is nearly vertical close to zero field. In the presence of stress, the curve shifts and bends as shown. Because the resistance change vs. field is so steep, a very slight bend in the curve results in a very large resistance change. This means that a slight stress will be translated into a large resistance change. This resistance change can be easily detected in a bridge circuit, as will be explained below with respect to FIG. 4. The spin valve structure thus acts as a strain-to-voltage transducer.

With proper selection of the films that make up the spin valve structure, the coupling field (i.e., the shift of the free layer magnetization loop arising from interaction of the free and pinned layers due to pinholes, orange-peel effect, and electronic effects) and the free layer coercivity can both be chosen so that the free layer reverses at or near zero applied field. The coercivity is one-half the width of the hysteresis loop and the coupling field is the shift of the loop along the horizontal axis. These properties can be varied in ways that are well known in the art. Through magnetoelastic coupling, a change in the strain state of the spin valve will cause the free layer squareness and coercivity to change. Because the free layer magnetization vs. field and electrical resistance vs. field (transfer curve) are directly related through giant magnetoresistance, the electrical resistance vs. field has changed due to the strain. In particular, under appropriate conditions described below, the electrical resistance at zero field has changed, leading to a zero field strain gauge signal that can be detected.

Figure 2B:
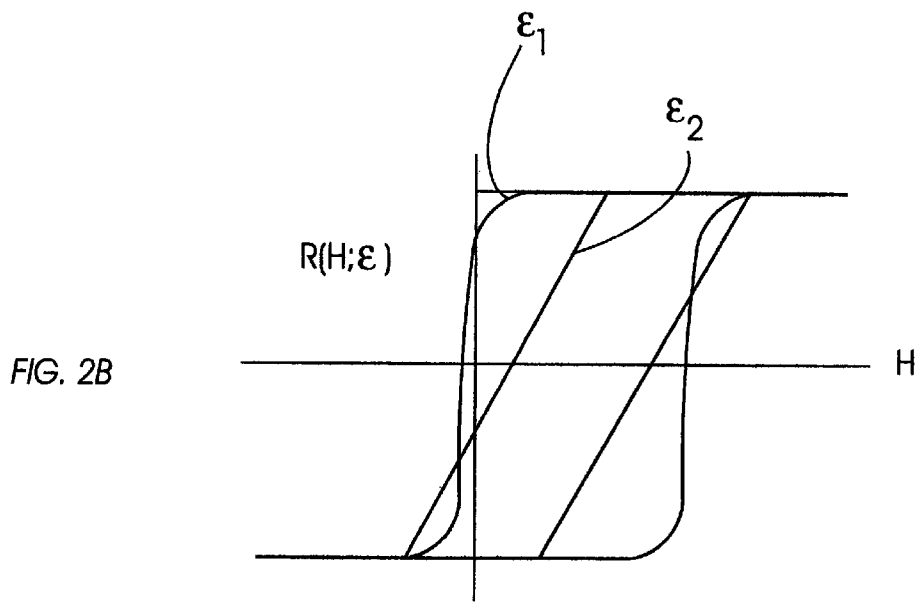
FIG. 2B is a curve of resistance as a function of applied magnetic field for the unstressed and stressed spin valve strain gauge showing a case where the curve nearly saturates at zero applied field.
Figure 2C:
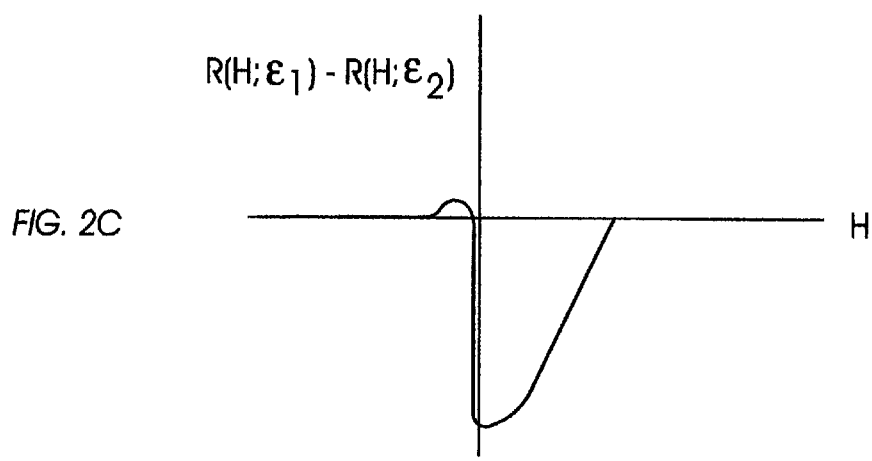
FIG. 2C shows the difference in resistance between the unstressed and stressed spin valve for the case shown in FIG. 2B.
Figure 2D:
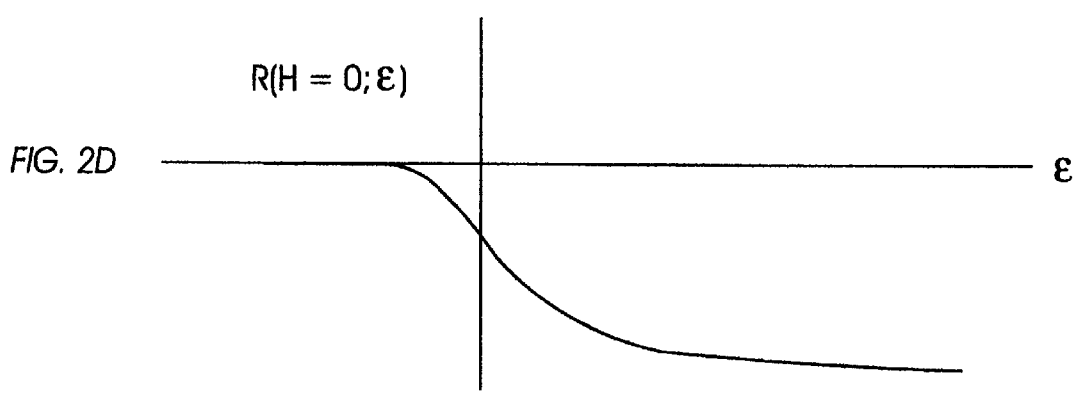
FIG. 2D shows the resistance at zero applied field as a function of strain for the spin valve shown in FIG. 2B.

The general conditions required for a significant zero applied field signal are that the initial and final strain state transfer curves are not saturated at zero field. To illustrate this point, consider FIGS. 2B, 2E, 2H, and 2K, where transfer curves for the initial ($\epsilon_1$) and final ($\epsilon_2$) strained states of spin valves with differing combinations of coupling field and free layer coercivity are shown. In FIG. 2B, the initial strain state is saturated near but not at zero field so that the steep part of the transfer curve is near zero field. FIG. 2C shows the difference between the resistance for the stressed and unstressed film for that portion of the hysteresis loop. There is a small region at negative field where the stressed film has higher resistance, and then a region at positive field where the stressed film has significantly lower resistance. FIG. 2D shows the resistance at zero field as a function of strain. The curve shows a region of strain where the slope is nonzero, which is the operating range of the sensor. This range is not symmetric about zero strain in this case, but rather the maximum sensitivity occurs at a finite value of strain. For the structure of FIGS. 1A–1B, this occurs at strains of the order of $10^4$, a useful operating strain region for certain applications, as discussed below.

Figure 2E:
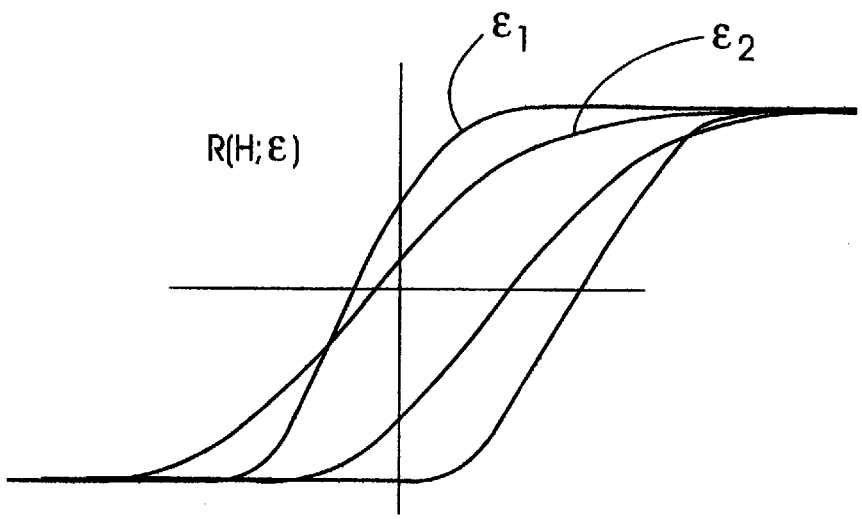
FIG. 2E is a curve of resistance as a function of applied magnetic field for the unstressed and stressed spin valve strain gauge showing the case in which the curve is not saturated near zero applied field and there is small coupling field.
Figure 2F:
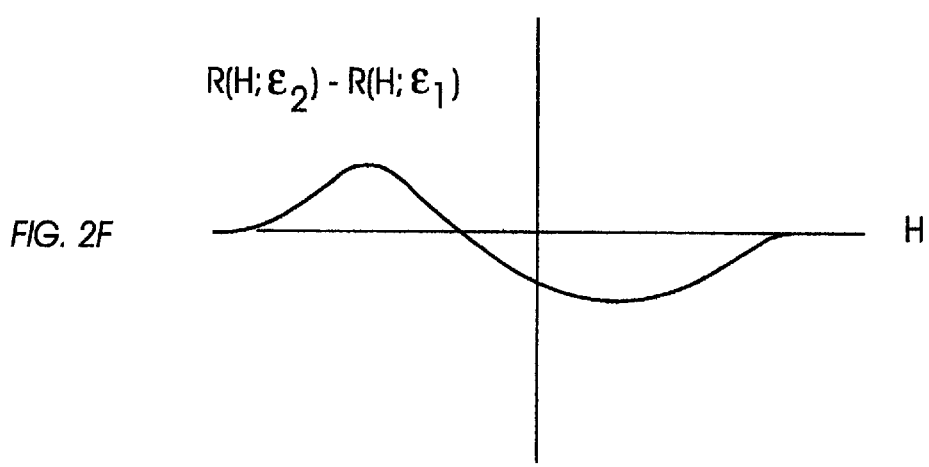
FIG. 2F shows the difference in resistance between the unstressed and stressed spin valve for the case shown in FIG. 2E.
Figure 2G:
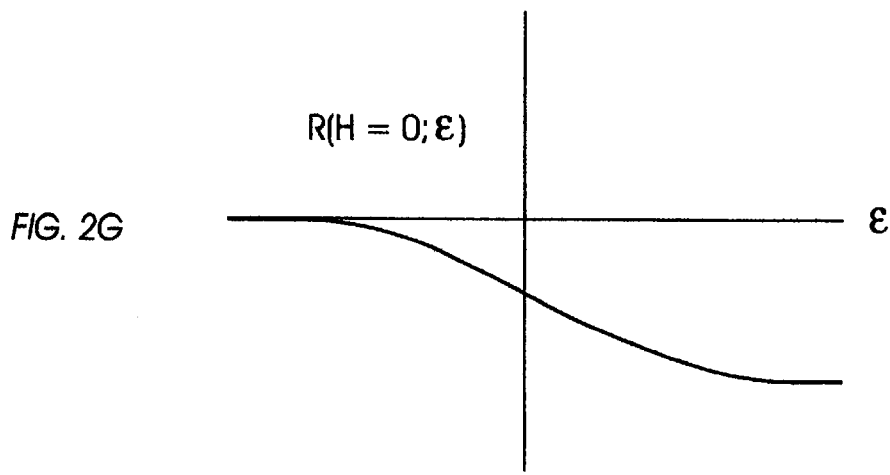
FIG. 2G shows the resistance at zero applied field as a function of strain for the spin valve shown in FIG. 2E.

In FIGS. 2E–2G, the initial strain state and final strain state both have nonunity squareness, and both positive and negative strain gauge signals will result from negative and positive applied strains. This is an illustration of the case where the transfer curves are not saturated in either direction near zero field. This gives a broad, symmetric response, as seen in FIG. 2G. This larger dynamic range may be desirable for some applications, making this the preferred embodiment for those cases. Here, the coupling field is smaller than or comparable to the change in effective uniaxial anisotropy field upon straining, leading to high sensitivity. The initial strain state can be achieved by applying an external strain to the film and substrate or can be the result of strain due to deposition.

Figure 2H:
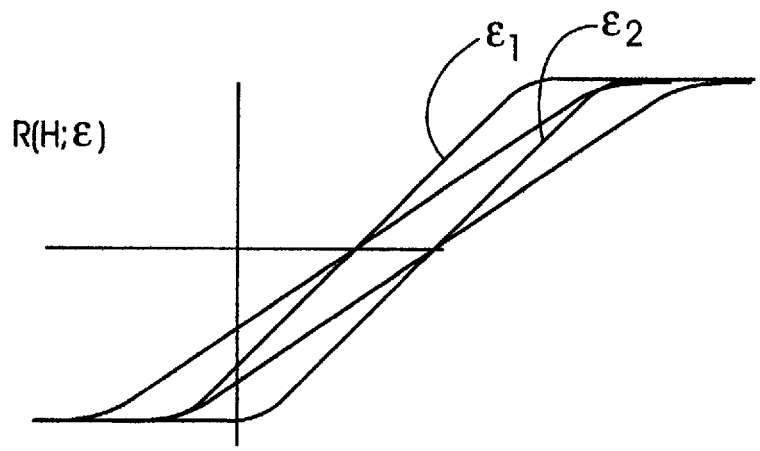
FIG. 2H is a curve of resistance as a function of applied magnetic field for the unstressed and stressed spin valve strain gauge showing the case in which the curve is not saturated near zero applied field and there is substantial coupling field.
Figure 2I:
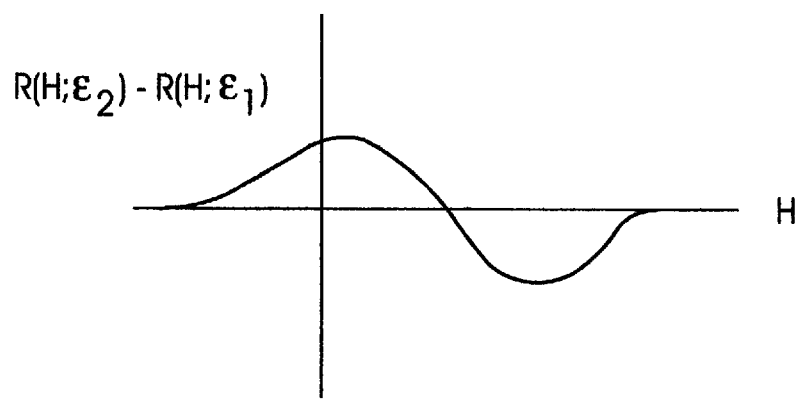
FIG. 2I shows the difference in resistance between the unstressed and stressed spin valve for the case shown in FIG. 2H.
Figure 2J:
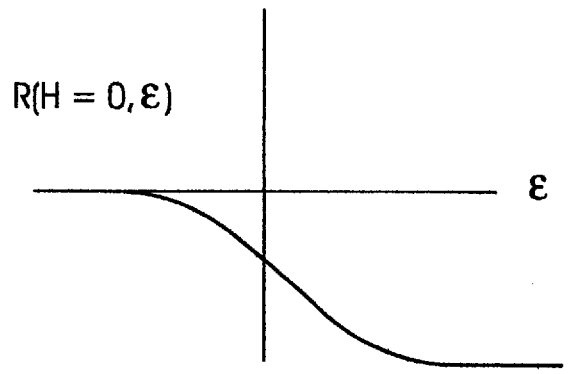
FIG. 2J shows the resistance at zero applied field as a function of strain for the spin valve shown in FIG. 2H.

If the coupling field is large compared with the change in anisotropy, the sensor is still operable provided that neither initial or final transfer curves are saturated, as indicated in FIGS. 2H–2J. However, the sensitivity is reduced as the change in resistance due to applied stress is only a small fraction of the total change $\Delta R$ achieved by reversing the magnetization of the free layer.

Figure 2K:
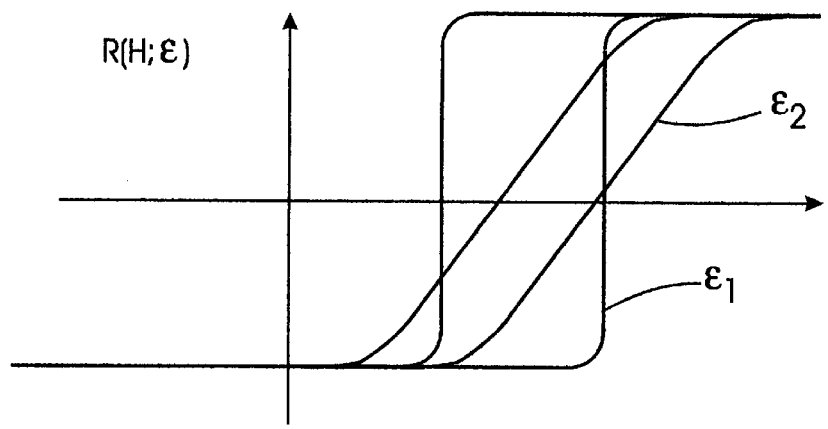
FIG. 2K is a curve of resistance as a function of applied magnetic field for the unstressed and stressed spin valve strain gauge showing the case in which the curve is saturated near zero applied field and there is substantial coupling field.
Figure 2L:
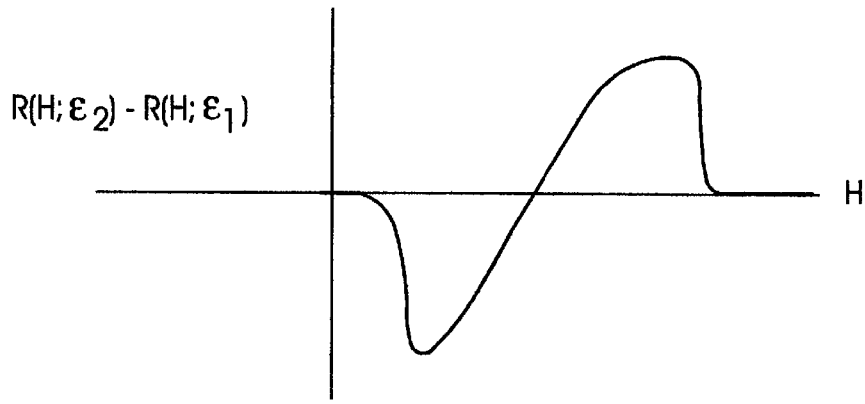
FIG. 2L shows the difference in resistance between the unstressed and stressed spin valve for the case shown in FIG. 2K.
Figure 2M:
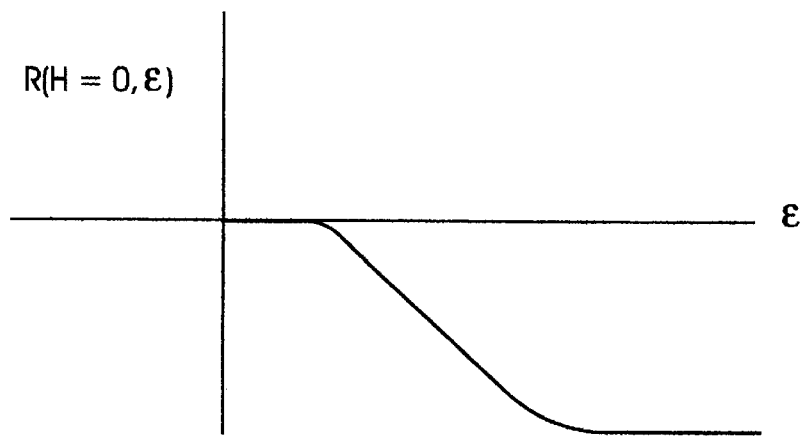
FIG. 2M shows the resistance at zero applied field as a function of strain for the spin valve shown in FIG. 2K.

Finally, FIGS. 2K–2M illustrate what happens if the initial or final strain transfer curves are saturated at zero field. This can happen from too large a coupling field or too large a coercivity. During some part of the strain process, there is no change in resistance. This region of zero strain gauge response is highly undesirable in a linear response system, but might be useful as a strain limit switch.

One application for an integrated, high sensitivity strain gauge is for detecting cantilever deflection in an AFM. The spin valve strain gauge allows for an integrated sensor to be combined with AFM cantilevers formed of materials other than single-crystal silicon, such as silicon nitride. It offers the advantages of thin film strain gauges, such as lower temperature sensitivity and less low-frequency noise, while offering strain sensitivity as good or much better than semiconductor gauges.

Figure 3:
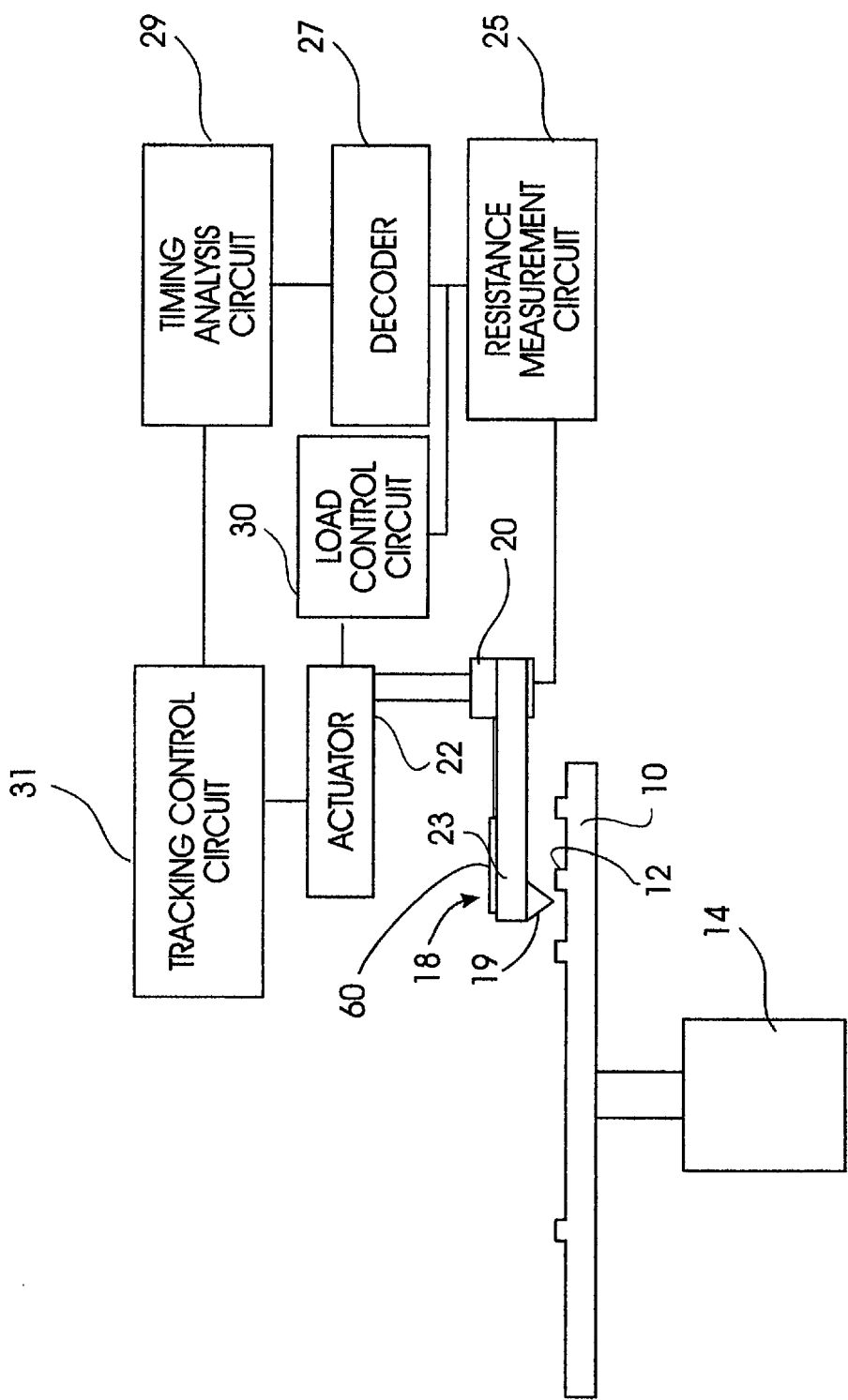
FIG. 3 is a block diagram of an AFM data storage system wherein the cantilever tip detects incongruencies on the surface of a recorded medium and the deflection is detected by a spin valve strain gauge formed on the cantilever.

Referring to FIG. 3, an AFM system is shown schematically as an AFM data storage disk drive with a rotatable data storage disk. While the AFM system will be described in terms of the preferred embodiment of a disk drive, the present invention is applicable to any AFM system where detection of the cantilever deflection is required.

In FIG. 3, the storage medium is preferably a circular disk 10 and may be formed in a number of ways. The disk 10 is preferably made from a polymer material, such as polymethyl methacrylate (PMMA), polycarbonate, or an acrylate-based, photo-curable polymer, as described in U.S. Pat. No. 4,948,703. The disk 10 is embossed on the upper face with machine-readable information, shown as surface incongruences 12. The phrase "machine-readable information" means information that is readable by a digital processing resource, such as a programmed computer or microprocessor. More specifically, a plurality of data tracks are provided having a series of surface incongruences arranged in a machine-readable pattern of data marks or features. The embossed incongruences may be a series of pits or indentations separated by island portions of the disk 10 that are not pitted. Alternatively, instead of pits, a series of raised protuberances or bumps could be provided, as shown by bumps 12. The data tracks are radially spaced on the disk and may be formed as either discrete concentric tracks, as in conventional digital magnetic recording disk drives, or spiral tracks, as in compact disc (CD) optical recording. Alternatively, the storage medium need not be circular and need not be moved in a rotary manner.

The disk 10 is positioned above a motor spindle 14. The disk 10 is supported on the motor spindle and rotated at a uniform speed by the motor 14. The disk 10 is positioned so that the center of the disk is located approximately at the center of rotation of the spindle motor. A high resolution contact sensor 18 with stylus 19 mounted on a support 20 is positioned above the disk. The support 20 is connected to an actuator 22. The actuator 22 is an electromagnetically-driven, voice coil-type actuator, as is found in an optical disk or CD player. The actuator 22 is movable both along an axis perpendicular to the disk surface for controlling the load of the stylus 19 on the disk 10, and in the plane parallel to the disk 10. The motion in the plane parallel to the disk 10 is at least partially in the radial direction from the center of rotation of the disk and allows the stylus 19 to be positioned to different data tracks.

The contact sensor includes a microfabricated cantilever 23 extending at one end from a base attached to support 20. A sharp stylus 19 is located at the free end of the cantilever 23. The stylus 19 is positioned to engage the surface of the storage disk 10. The stylus is downwardly biased so that it tracks the surface topography of the disk. When the disk 10 is rotated, the cantilever 23 rises and falls as the stylus 19 tracks over the incongruences 12 on the surface of the storage disk. The cantilever 23 serves as a substrate and includes a spin valve strain gauge 60 formed on it.

Figure 4:
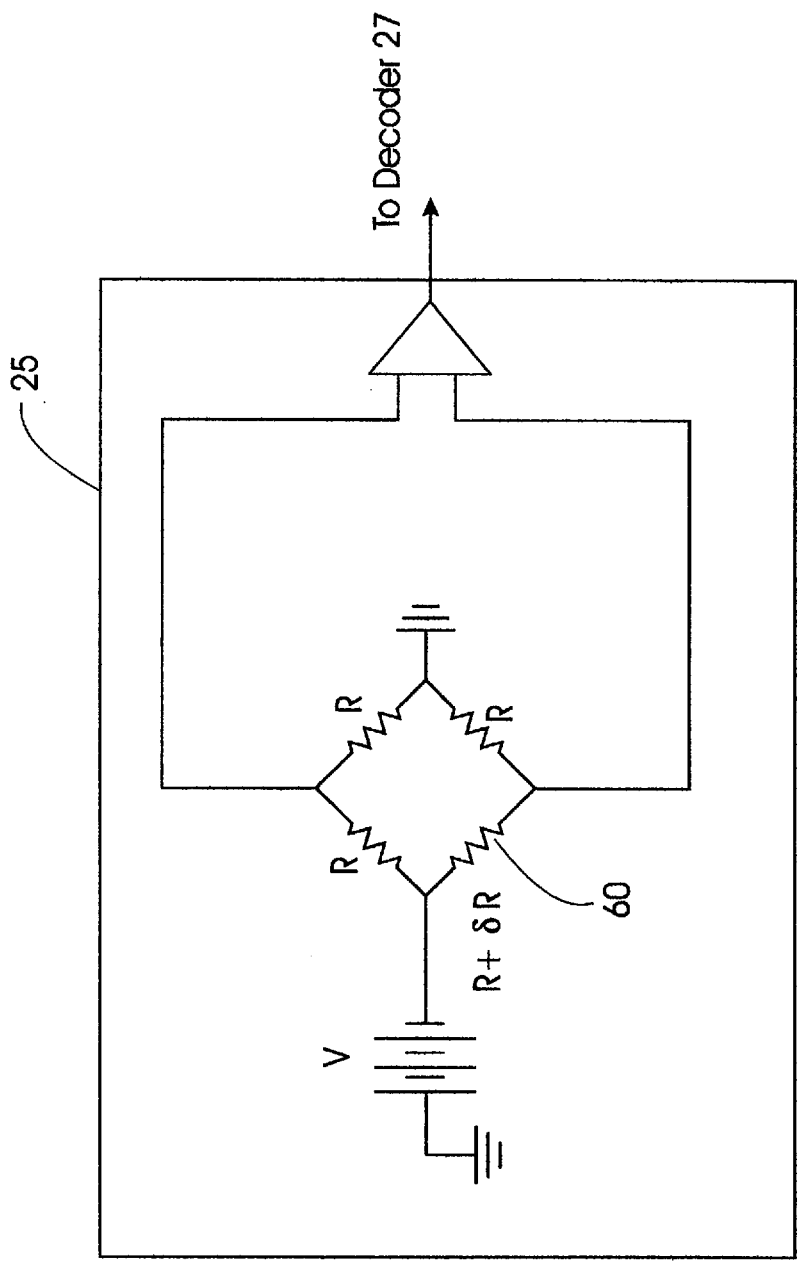
FIG. 4 is a schematic of the resistance measurement circuit used to detect cantilever deflections in the AFM data storage system of FIG. 3.

A resistance measurement circuit 25 is connected to the spin valve strain gauge 60 on cantilever 23 by means of conducting wires. As the stylus 19 tracks the incongruences of the storage disk 10, the resistance of spin valve strain gauge 60 on cantilever 23 changes. This change is continuously monitored and measured by means of the resistance measurement circuit 25. The resistance measurement circuit 25 has a drive voltage (V) and a resistance bridge suitable for measuring small changes in resistance ($\delta R$), as shown in FIG. 4. Each of the three fixed resistors R in the bridge has a resistance approximately equal to the resistance of the spin valve strain gauge 60 when cantilever 23 is not bent. The measured output voltage $\Delta V$ due to the change in resistance $\delta R$ of the cantilever when it is bent is approximately $(V/4)*(\delta R)$.

The typical fractional change in lever resistance, $\delta R/R$, is of the order $10^{-7}$ to $10^{-5}$ per Angstrom of deflection and can be as large as 0.5 ($\Delta R/R$). For incongruences 50 nm high and a driving voltage of 2 volts, this produces an output voltage $\Delta V$ of approximately 0.1–10 mV. This analog voltage change from resistance measurement circuit 25 is amplified and then converted into a digital signal by a decoder 27. Such decoding can be done either by means of conventional peak detection or threshold detection, depending on the method of data encoding used.

The system of FIG. 3 can be operated in a "constant force" mode, a "constant height" mode, or a combination thereof. In a constant force mode, the movement of the actuator 22 perpendicular to the disk is controlled by the load control circuit 30 which uses information obtained from the spin valve region 60 in cantilever 23, via the resistance measurement circuit 25 as to the features on the disk surface. The signal sent to the actuator 22 from the load control circuit 30 can be used to maintain constant cantilever deflection, and thus a constant loading force on the stylus 19. In constant height mode, the actuator 22 does not move the cantilever 23 perpendicular to the disk surface so the cantilever deflects varying amounts as the surface incongruences pass under it. In combination mode, the load control circuit 30 and actuator 22 are used to maintain a generally constant loading force on a long-time scale, taking out variations due to long-term drift, for example, or large features on the surface of the disk. The cantilever 23 is left free to deflect, however, as the stylus 19 encounters the small surface incongruences. In a data storage application, the combination mode is the preferred embodiment. In each case, however, the signal from the resistance measurement circuit 25 is used as the input to the decoder 27, which converts it to binary form, i.e., machine-readable information, in a manner well known in the art. The resistance measurement circuit 25 and decoder 27 also detect timing marks that extend across the tracks and are used for maintaining the stylus on the desired track. A timing analysis circuit 29 determines the time between the timing marks and compares this to a target value. The difference is input to the tracking control circuit 31. Using standard control electronics, the tracking control circuit 31 drives the actuator 22 to move the stylus 19 toward the desired track.

Figure 5A:
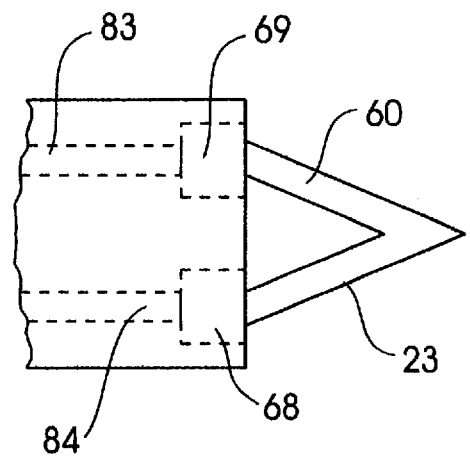
FIG. 5A is a view of the cantilever illustrating the spin valve strain gauge and contacts for electrical leads formed on the cantilever.
Figure 5B:
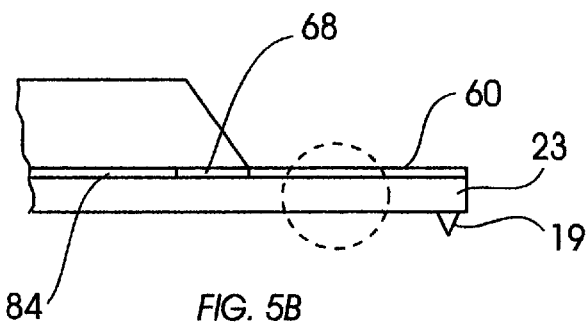
FIG. 5B is a side view of the cantilever of FIG. 5A.
Figure 5C:
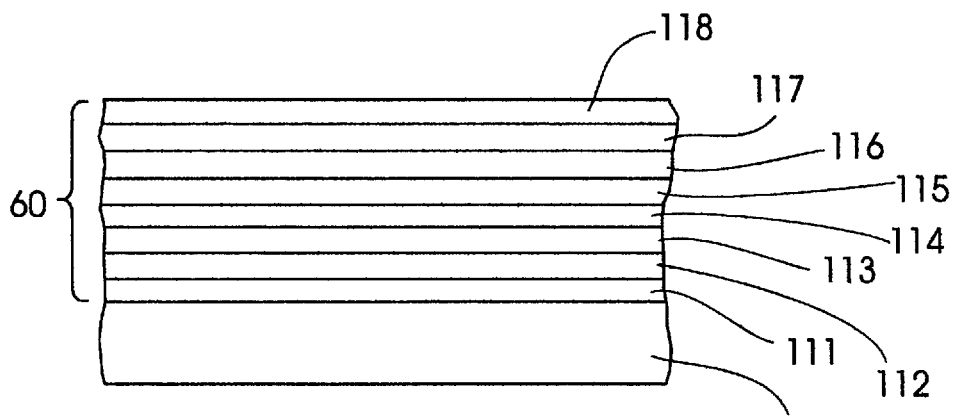
FIG. 5C is a sectional view of the dashed circle portion of FIG. 5B and illustrates the cantilever and films forming the spin valve strain gauge.

An embodiment of the AFM cantilever 23 with spin valve strain gauge 60 is shown in FIGS. 5A–5B. FIG. 5A is a top view and shows the spin valve strain gauge 60 formed on both legs of cantilever 23 and having regions 68, 69 that make electrical contact with the leads 84, 83 that connect to the resistance measurement circuit 25. In this case, the spin valve strain gauge 60 is deposited onto the "top" side (the side opposite stylus 19) of silicon nitride cantilever 23. FIG. 5C is an enlarged view of the dashed circle region of FIG. 5B and illustrates the section of cantilever 23 supporting the spin valve strain gauge 60 and the spin valve films 111–118.

Figure 6A:
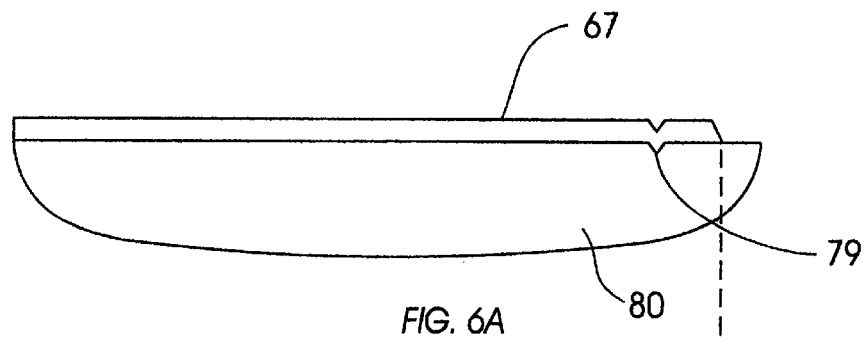
FIGS. 6A–6J illustrate steps in the fabrication of the cantilever with spin valve strain gauge.
Figure 6B:
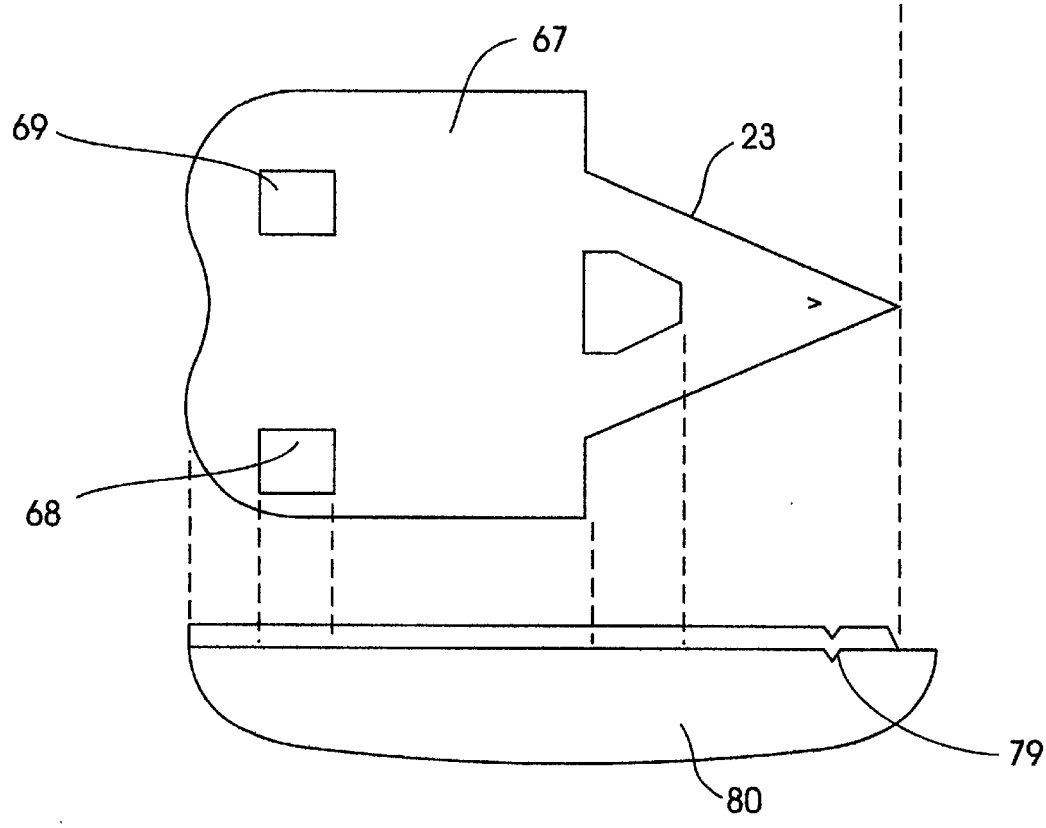
Figure 6C:
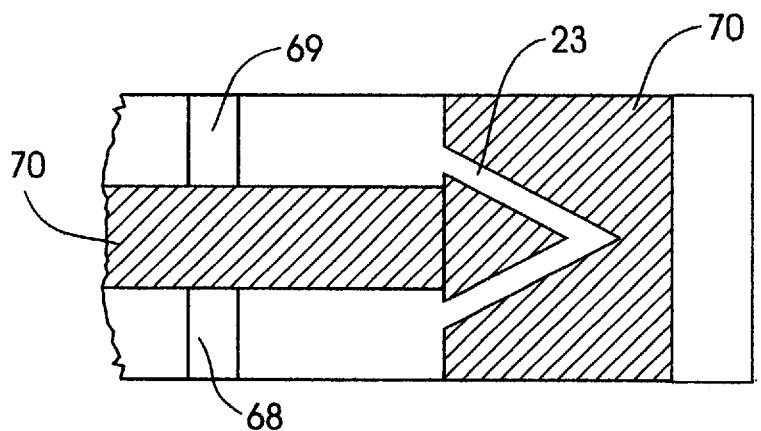
Figure 6D:
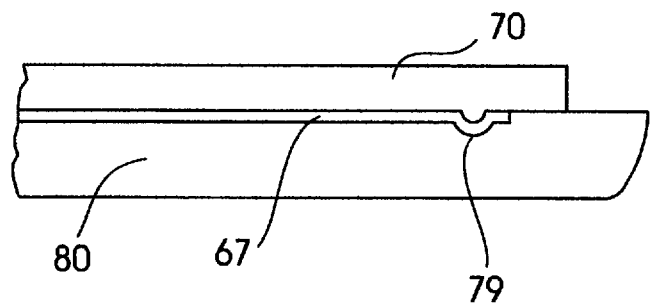
Figure 6E:
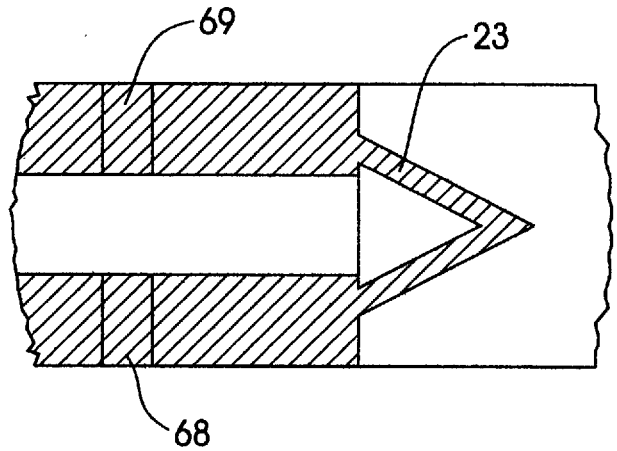
Figure 6F:
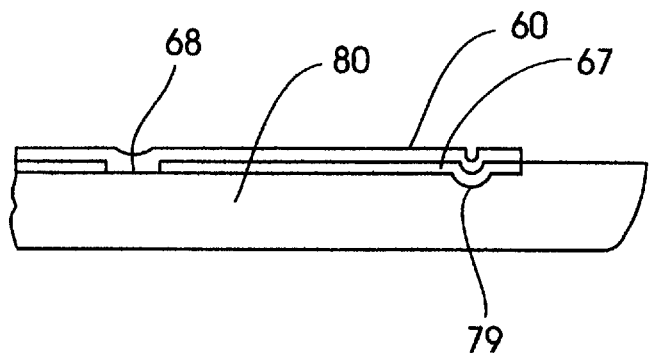

A process for forming a silicon nitride AFM cantilever is described by Albrecht et al., *J. Vac. Sci. Technol. A*, Vol. 8, 1990, page 3386. The same process is used to form the cantilever 23, with one modification and the addition of one photolithographic step to define the spin valve strain gauge 60. Referring to FIG. 6A, the process starts by forming a silicon nitride film 67 on a silicon substrate 80. A depression 79 in the silicon substrate 80 provides the location for the stylus 19. When the cantilever is patterned as in FIG. 6B, the silicon nitride film 67 is removed over two additional regions 68, 69, which will form vias to allow electrical contact to the spin valve films. The regions 68, 69 are formed in the same step used to define the cantilever 23. Next, as shown in FIG. 6C, a photoresist layer 70 is spun onto the substrate containing the unreleased cantilever 23. The photoresist 70 is then lithographically defined into the pattern shown by the hatched lines in FIG. 6C, so as to expose the cantilever region 23, the two via regions 68, 69 in the silicon nitride film 67 and the regions that will form the electrical leads. A side view of FIG. 6C is shown in FIG. 6D. The series of films 111–118 comprising the spin valve strain gauge 60 are then sputter deposited as described above. This is done over the entire substrate to deposit the spin valve films onto the silicon nitride film 67 in the regions not covered by photoresist 70. The photoresist 70 is dissolved and removed in a solvent, such as acetone, in a well-known manner to produce a lift off of the films. What remains, as shown in FIGS. 6E–6F, is the cantilever 23 which is coated with a spin valve strain gauge 60 on its "back" surface, i.e., the surface opposite the stylus 19.

Figure 6G:
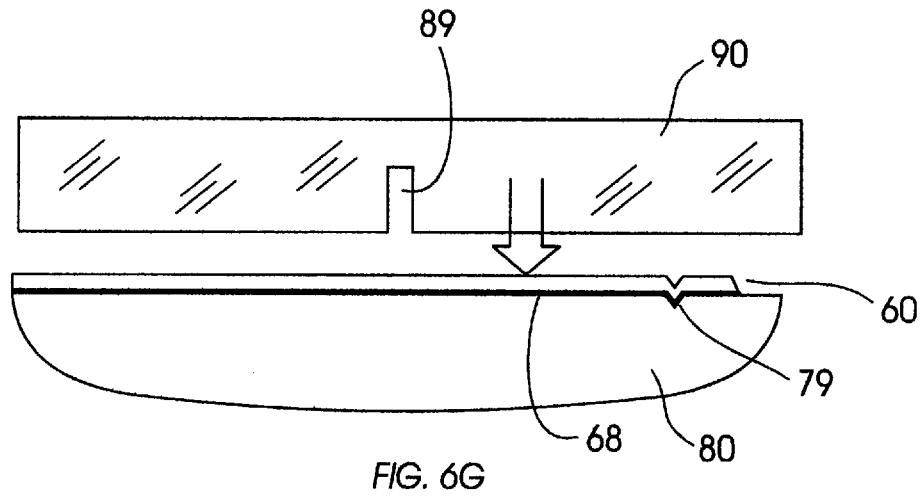
Figure 6H:
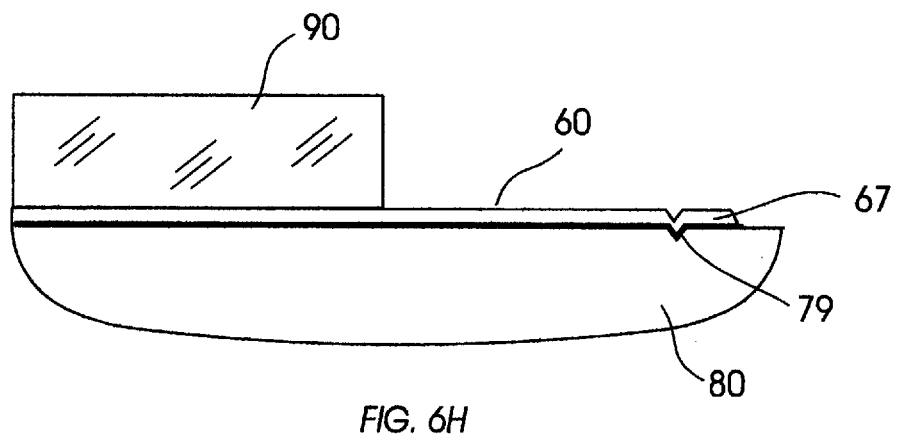
Figure 6I:
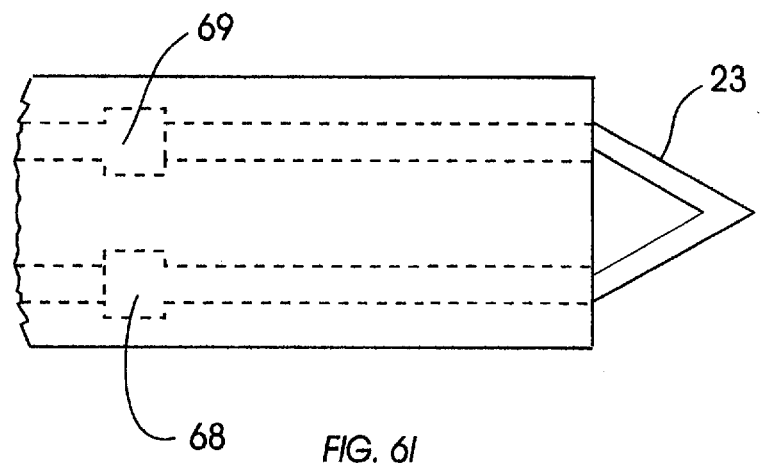
Figure 6J:
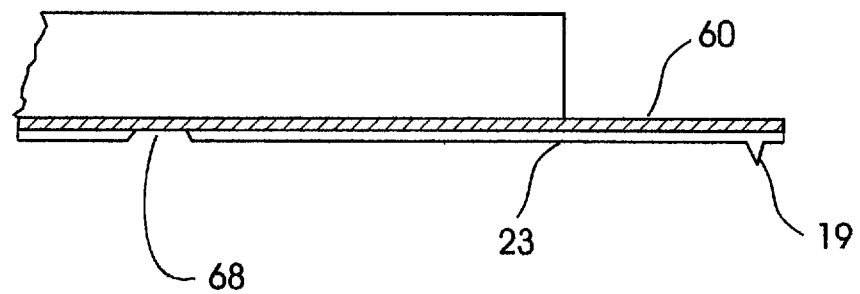

Next, as shown in FIGS. 6G–6H, a glass substrate 90 is anodically bonded to the substrate 80 with silicon nitride film 67 and spin valve strain gauge 60, the portion of the glass over the cantilever 23 is removed at the saw cut 89 in the glass substrate 90, and the silicon substrate 80 is then removed. The resulting structure is shown in the top and side views of FIGS. 6I–6J, respectively. Electrical contact to the spin valve strain gauge 60 is made through the exposed regions 68, 69. Because the spin valve strain gauge 60 is quite thin, little additional mass or stress is added to the cantilever 23.

Figure 7:
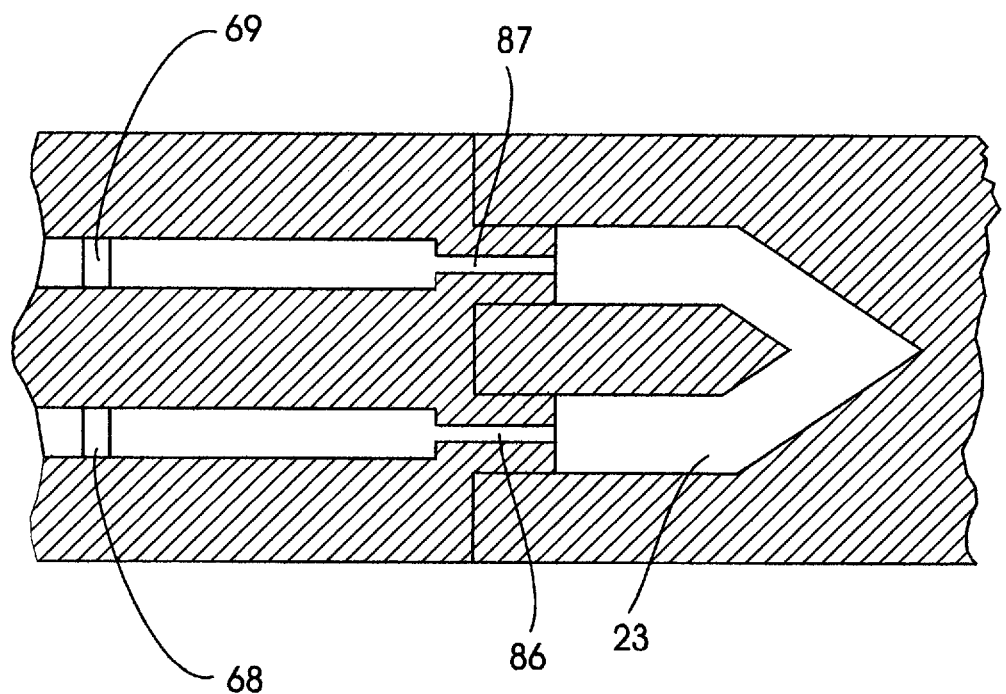
FIG. 7 is an illustration of an alternative cantilever with spin valve strain gauge having constriction regions for enhanced sensitivity.

The diagrams shown in FIGS. 6A–6J illustrate a simple mask design for the patterning of the spin valve films, but it is understood that more complex designs can be accommodated. One example is shown in FIG. 7 and follows the identical process as in FIGS. 6A–6J, but constriction regions 86, 87 are formed in the spin valve films via appropriate patterning. The constriction regions 86, 87 are made at the base near the fixed end of the cantilever 23, where the stresses are highest, to improve the sensitivity of the strain gauge 60.

Figure 8A:
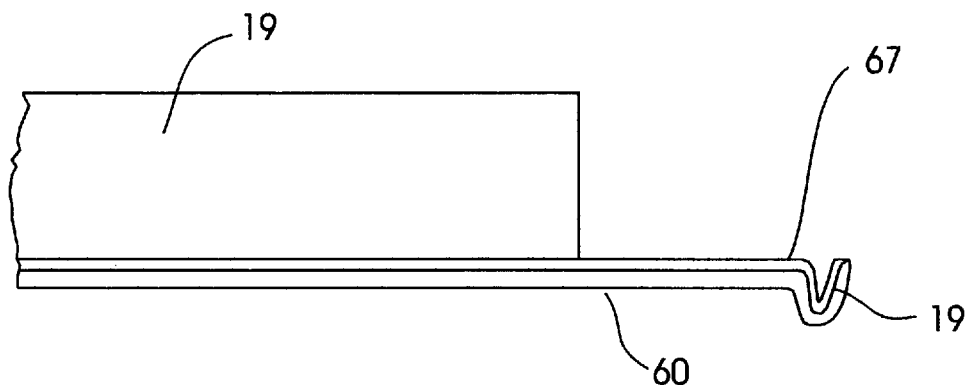
FIGS. 8A–8B illustrate steps in an alternative fabrication method for a cantilever with spin valve strain gauge wherein the spin valve films are formed after formation of the cantilever.
Figure 8B:
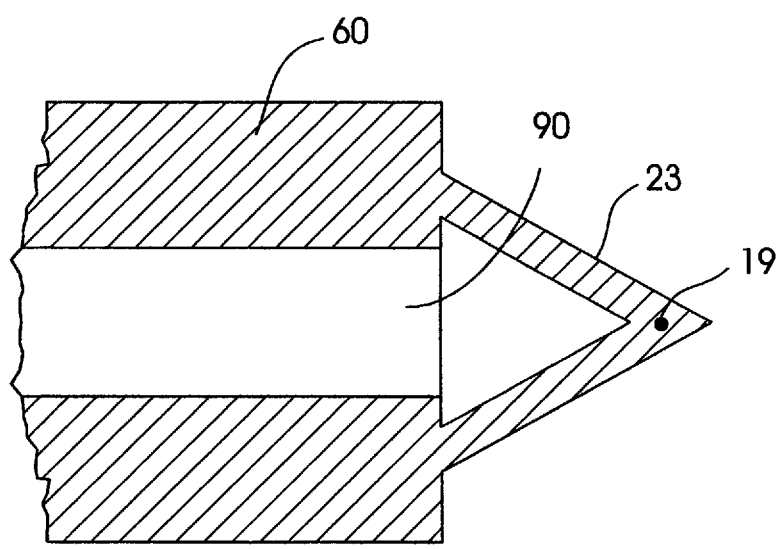

Referring to FIG. 8A, another embodiment is to deposit the spin valve films on the cantilever after the cantilever has been released from the silicon substrate. In this case, the spin valve films are deposited on the "front" surface of the cantilever, i.e., the same side as the stylus 19. To define the current path down the cantilever 23, a lift-off technique is used which involves patterning photoresist and then depositing the spin valve films. Alternatively, the spin valve films can be deposited over the cantilver, and then laser ablation is used to remove the films to form the current path. Wet or dry etches can also be used to remove the spin valve films instead of laser ablation. In all cases, the resulting structure is as shown in the bottom view of FIG. 8B, with the spin valve strain gauge 60 coating the front of the cantilever 23 and part of the glass substrate 90 to define the current path.

The AFM cantilever typically operates with the tip in contact at some preloaded force. The force is applied through appropriate loading of the cantilever, which gives rise to a certain strain. In operation, the loading distance is of the order of 100 nm, and small cantilever deflections are detected about that loading distance. Such a loading distance would give rise to strain in the range of $10^{-5}$ to $10^{-4}$. This level of strain is compatible with the operating levels where the spin valve structures described above are most sensitive.

As used herein, the term "scanning" is meant to refer to movement of the AFM tip relative to the sample, and is not limited merely to conventional AFM imaging. The scanning can be done either with the tip in contact with the surface, or with the tip in close proximity or near-contact to the surface. Also as described herein, the term "cantilever" is meant to refer to a cantilever mounted in the AFM system, as well as to a cantilever prior to its incorporation into a larger system.

While the preferred embodiments of the present invention have been illustrated in detail, it should be apparent that modifications and improvements may be made to the invention without departing from the spirit and scope of the invention as described in the following claims.

What is claimed is:

1. A spin valve magnetoresistive strain gauge for measuring strain in the absence of an applied magnetic field when connected to an electrical resistance measurement circuitry, the strain gauge comprising:

a substrate;

a free ferromagnetic layer formed on the substrate and having nonzero magnetostriction, and whose magnetic moment is free to rotate in the presence of an applied magnetic field, the free ferromagnetic layer comprising a trilayer of Ni-Fe alloy, a layer consisting essentially of Ni formed on the Ni-Fe layer, and a layer consisting essentially of Co formed on the Ni layer;

a pinned ferromagnetic layer whose magnetic moment is prevented from rotation in the presence of an applied magnetic field less than a predetermined value; and a nonferromagnetic metallic conducting spacer layer located between and in contact with the free and pinned ferromagnetic layers; whereby, in the absence of an applied magnetic field, an applied stress to the free ferromagnetic layer due to deflection of the substrate gives rise to an angular displacement of the magnetic moment of the free layer relative to the magnetic moment of the pinned ferromagnetic layer and a resulting change in the electrical resistance of the spin valve magnetoresistive strain gauge.

2. An atomic force microscope system for scanning the surface of a sample, the system comprising:

a sample holder;

a cantilever having a fixed end, a free end, and a length terminating at the free end as a cantilever tip;

a spin valve magnetoresistive structure comprising a plurality of films formed on the cantilever;

electrical resistance detection circuitry coupled to the spin valve structure on the cantilever for detecting changes in electrical resistance of the spin valve structure in response to deflection of the cantilever tip; and an actuator for moving the cantilever tip and the sample holder relative to one another, whereby the sample held in the sample holder causes deflection of the cantilever tip during scanning and the deflection is detected by the electrical resistance detection circuitry.

3. The system according to claim 2 wherein the plurality of films in the spin valve structure comprises a ferromagnetic layer having nonzero magnetostriction and whose magnetic moment is free to rotate in the presence of an applied magnetic field, a pinned ferromagnetic layer, and a nonferromagnetic metallic conducting spacer layer between and in contact with the free and pinned ferromagnetic layers; whereby an applied stress to the free ferromagnetic layer due to deflection of the cantilever gives rise to an angular displacement of magnetic moment of the free layer and a resulting change in the electrical resistance of the spin valve structure.

4. The system according to claim 3 wherein the free ferromagnetic layer is a trilayer comprising a layer of Ni-Fe alloy, a layer consisting essentially of Ni formed on the Ni-Fe layer, and a layer consisting essentially of Co formed on the Ni layer.

5. The system according to claim 3 further comprising a layer of antiferromagnetic material formed on and in contact with the pinned ferromagnetic layer for pinning the magnetic moment of the pinned layer.

6. The system according to claim 2 wherein the cantilever is formed of silicon nitride, and wherein the plurality of spin valve films are formed on the silicon nitride.

7. The system according to claim 2 further comprising a sample to be scanned, the sample having a surface with incongruencies representing data, whereby the electrical resistance detection circuitry detects data recorded on the surface of the sample.

8. The system according to claim 7 wherein the sample is a disk, and further comprising a motor coupled to the sample holder for rotating the disk about an axis generally perpendicular to the disk surface to be scanned.

9. An atomic force microscope-based data storage disk drive comprising:

a data storage disk having on its surface a plurality of data tracks of surface incongruences representing machine-readable information;

a motor for rotating the disk;

a flexible cantilever having a fixed end, a free end, and a contact stylus on its free end for engaging and contacting the surface incongruences on the disk during rotation of the disk;

a spin valve magnetoresistive strain gauge formed on the cantilever and comprising a free ferromagnetic layer having nonzero magnetostriction and whose magnetic moment is free to rotate in the presence of an applied magnetic field, a pinned ferromagnetic layer, an antiferromagnetic layer formed on and in contact with the pinned ferromagnetic layer for pinning the magnetic moment of the pinned layer, and a nonferromagnetic metallic conducting spacer layer located between and in contact with the free and pinned ferromagnetic layers;

electrical resistance detection circuitry coupled to the spin valve magnetoresistive strain gauge; whereby, in the absence of an applied magnetic field, applied stresses to the free ferromagnetic layer due to deflection of the cantilever when the stylus contacts surface incongruences on the disk give rise to angular displacements of the magnetic moment of the free layer and a resulting change in the electrical resistance of the spin valve magnetoresistive strain gauge;

an actuator connected to the cantilever for maintaining the stylus on a data track; and a data decoding circuit for receiving the output signal from the electrical resistance detector and for converting the output signal to digital data signals representative of the machine-readable information formed by the surface incongruences on the disk.

10. The disk drive according to claim 9 wherein the free ferromagnetic layer is a trilayer comprising a layer of Ni-Fe alloy, a layer consisting essentially of Ni formed on the Ni-Fe layer, and a layer consisting essentially of Co formed on the Ni layer.

11. The disk drive according to claim 9 wherein the cantilever is formed of silicon nitride and wherein the spin valve magnetoresistive strain gauge is formed on the silicon nitride.

* * * * *